United States Patent [19]
Hwang

[11] Patent Number: 6,031,799
[45] Date of Patent: Feb. 29, 2000

[54] TRACKING BALANCE CORRECTION APPARATUS IN AN OPTICAL DISC SYSTEM

[75] Inventor: Yong-Ha Hwang, Sungnam, Rep. of Korea

[73] Assignee: Samsung Electronics Co., Ltd., Suwon, Rep. of Korea

[21] Appl. No.: 08/980,204

[22] Filed: Nov. 28, 1997

[30] Foreign Application Priority Data

Nov. 29, 1996 [KR] Rep. of Korea ...................... 96-59950

[51] Int. Cl.[7] ...................................... G11B 7/00
[52] U.S. Cl. ................... 369/44.41; 369/44.35; 369/54
[58] Field of Search ............... 369/44.27, 44.28, 369/44.29, 44.35, 48, 47, 58, 54

[56] References Cited

U.S. PATENT DOCUMENTS

| | | | |
|---|---|---|---|
| 5,502,698 | 3/1996 | Mochizuki | 369/44.35 |
| 5,517,475 | 5/1996 | Koyama et al. | 369/44.35 |
| 5,539,710 | 7/1996 | Tokushuku et al. | 369/44.35 |
| 5,761,171 | 6/1998 | Tobita | 369/48 |
| 5,793,738 | 8/1998 | Fukushima et al. | 369/47 |
| 5,808,983 | 9/1998 | Tsutsui et al. | 369/44.35 |
| 5,808,989 | 9/1998 | Ueki et al. | 369/58 |
| 5,875,157 | 2/1999 | Sasaki et al. | 369/44.35 |

*Primary Examiner*—Nabil Hindi
*Attorney, Agent, or Firm*—Staas & Halsey

[57] ABSTRACT

A tracking balance correction apparatus includes a pickup unit which detects a beam reflected from an optical disc and outputs a high frequency reproduction signal and diagonal summing signals, a tracking balance correction unit which receives the diagonal summing signals output from the pickup unit, adjusts phases of the received diagonal summing signals to detect a differential phase, generates and outputs the detected differential phase as a tracking error signal, an envelope detection unit which detects an envelope of the RF signal output from the pickup unit to output an envelope signal, and a digital signal processor which receives the tracking error signal from the tracking balance correction unit, generates a tracking drive voltage to set the tracking error signal to zero, and controls tracking of the pickup unit, and at the same time generates a tracking balance correction voltage according to a maximum magnitude of the envelope signal input from the envelope detection unit, to then output the generated voltage to the tracking balance correction unit.

14 Claims, 3 Drawing Sheets

TRACKING BALANCE CORRECTION APPARATUS IN AN OPTICAL DISC SYSTEM

BACKGROUND OF THE INVENTION

1. Field of the Invention

The present invention relates to an optical disc system, and more particularly, to a tracking balance correction apparatus for use in an optical disc system using a tracking servo method of obtaining a tracking error signal via differential phase detection.

2. Description of the Related Art

An optical disc system irradiates a laser beam on an optical disc on which information is recorded and detects a beam reflected from the surface of the disc, to then reproduce a signal using the detected beam. A digital versatile disc (DVD) or a compact disc (CD) records information through a cavity called a pit. Therefore, when controlling tracking servo in order to accurately trace using a laser beam with respect to successive pits, the optical disc system should adjust tracking balance to make the laser beam be positioned in the middle of a pit. Prior art relating to tracking balance is disclosed in Korean Patent Application No. 96-51271 assigned to the same assignee.

Korean Patent Application No. 96-51271 discloses a method employed in a tracking servo technique for detecting the distribution of an intensity of light varied with a relative position of a beam irradiated on a disc and a pit of the disc using an optical detector including four light receiving elements, and for generating a tracking error signal based on a differential phase between diagonal summing signals each being obtained from the signals detected by the light receiving elements located on a diagonal line. According to the method disclosed in that application, a digital signal processor receives a tracking error signal, generates a correction voltage which makes a value of the tracking error signal be set to zero, and delays a diagonal summing signal according to the correction voltage to fit the phases of two diagonal summing signals. As a result, tracking balance is corrected.

However, even though the phases of the diagonal summing signals detected by the optical detector are in accord, it is not always that a beam is placed in the middle of a pit. This will be described in more detail with reference to FIGS. 1A and 1B.

In case of FIG. 1A showing that the center of a beam 'b' is placed in the middle of a pit 'p', the phases of diagonal summing signals A and B are in accord. In case of FIG. 1B showing the center of a beam 'b' is placed in the brim of a pit 'p', tracking balance is not in accord, but the phases of diagonal summing signals A and B are in accord. Consequently, there is a drawback that the tracking balance cannot completely be corrected using only the differential phase of the diagonal summing signals.

SUMMARY OF THE INVENTION

To solve the above problem, it is an object of the present invention to provide an apparatus for correcting tracking balance, considering an envelope of a high frequency reproduction signal detected from a disc, for use in an optical disc system which obtains a tracking error signal via differential phase detection of diagonal summing signals.

Additional objects and advantages of the invention will be set forth in part in the description which follows and, in part, will be obvious from the description, or may be learned by practice of the invention.

To accomplish the above and other objects of the present invention, there is provided an apparatus for correcting tracking balance for use in an optical disc system which obtains a tracking error signal via differential phase detection, the tracking balance correction apparatus including a pickup unit for detecting a beam reflected from an optical disc and outputting a high frequency reproduction signal and diagonal summing signals; a tracking balance correction unit receiving the diagonal summing signals output from the pickup unit, for adjusting phases of the received diagonal summing signals to detect a differential phase, and generating and outputting the detected differential phase as the tracking error signal; an envelope detection unit for detecting an envelope of the RF signal output from the pickup unit to output an envelope signal; and a digital signal processor for receiving the tracking error signal from the tracking balance correction unit, generating a tracking drive voltage to set the tracking error signal to zero, and controlling tracking of the pickup unit, and at the same time generating a tracking balance correction voltage according to a maximum magnitude of the envelope signal input from the envelope detection unit, to then output the generated voltage to the tracking balance correction unit.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENT

A preferred embodiment of the present invention will be described below in more detail with reference to the accompanying drawings.

Figure 1:
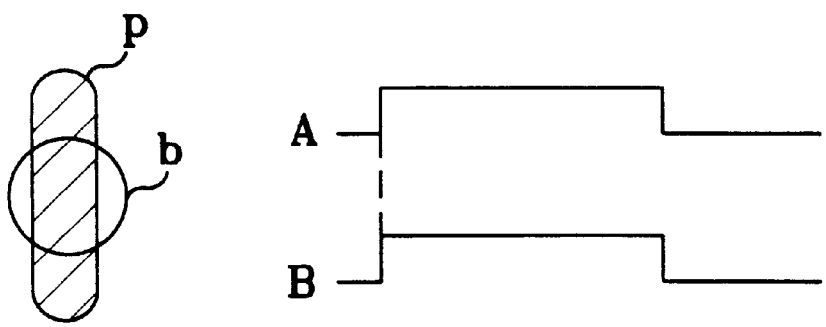
FIGS. 1A and 1B are views for explaining the position relationship between a beam spot and a pit, and the phase relationship of diagonal summing signals detected by an optical detector.
Figure 1:
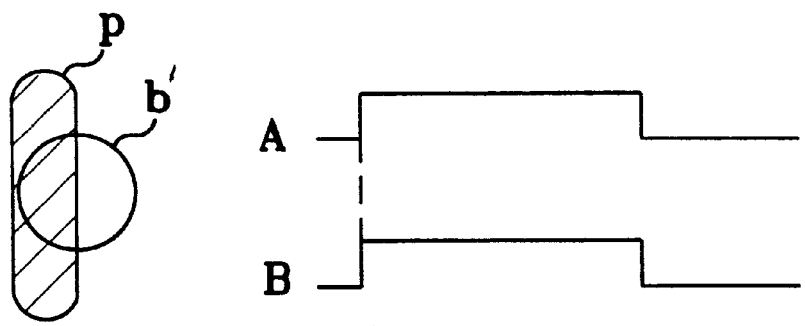

The present invention corrects more accurately tracking balance, considering that an envelope of a high frequency reproduction signal detected from an optical disc in the case as being shown in FIG. 1B is smaller than that of a high frequency reproduction signal detected from an optical disc in the case as being shown in FIG. 1A.

Figure 2:
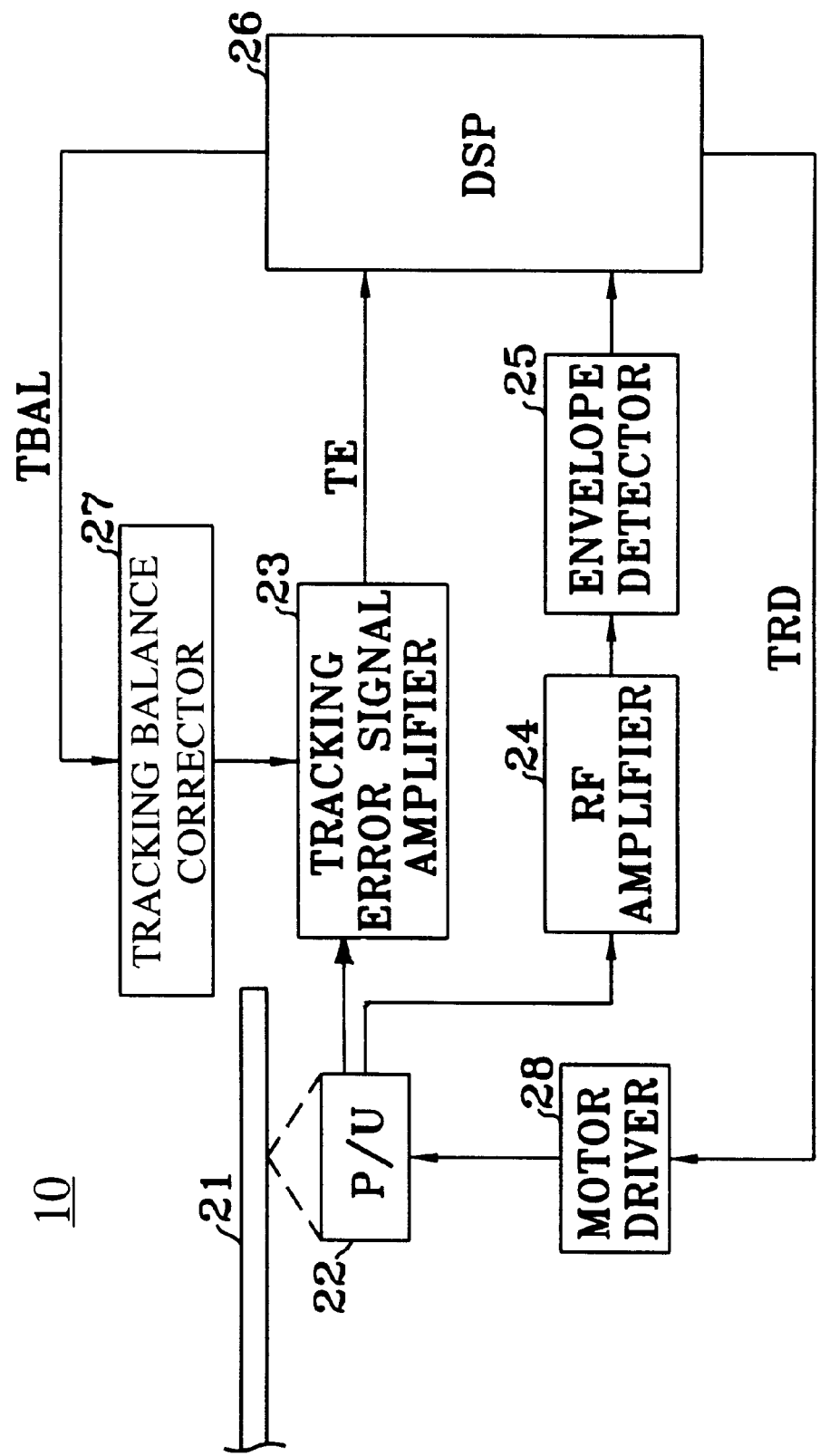
FIG. 2 is a block diagram illustrating an optical disc system adopting a tracking balance correction apparatus according to an embodiment of the present invention.

Referring to FIG. 2, the optical disc system 10 adopting a tracking balance correction apparatus according to an embodiment of the present invention includes a pickup circuit 22 for irradiating a laser beam on an optical disc 21 and generating a radio frequency (RF) signal being a high frequency reproduction signal. The pickup circuit 22 includes a quartered optical detector (not shown) for receiving a beam reflected from the optical disc 21. An output terminal of the pickup circuit 22 is connected to a tracking error signal amplifier 23 for receiving diagonal summing signals detected by the quartered optical detector and generating a tracking error signal TE representing a differential phase between the diagonal summing signals. Another output terminal of the pickup circuit 22 is connected to a radio frequency (RF) amplifier 24 for amplifying the RF signal detected by the quartered optical detector by a predetermined level. An envelope detector 25 for detecting an envelope of the amplified RF signal is connected to an output terminal of the RF amplifier 24. A digital signal processor 26 for generating a tracking drive voltage TRD and a tracking balance correction voltage TBAL, using the output signals from the tracking error signal amplifier 23 and the envelope detector 25, is connected to output terminals of the tracking error signal amplifier 23 and the envelope detector 25. One output terminal of the digital signal processor (DSP) 26 is connected to a tracking balance corrector 27 for receiving the tracking balance correction voltage TBAL from the DSP 26, and the tracking balance corrector 27 generates a phase correction signal for adjusting phases of the diagonal summing signals input to the tracking error signal amplifier 23, and outputs the phase correction signal to the tracking error signal amplifier 23. Also, another output terminal of the digital signal processor 26 is connected to a motor driver 28 for receiving the tracking drive voltage from the DSP 26 and driving tracking servo of the pickup circuit 22.

An operation of the optical disc system shown in FIG. 2 and constructed as described above will be described in detail.

The pickup circuit 22 detects the beam reflected from the optical disc 21 via a quartered optical detector and generates diagonal summing signals and a RF signal. The diagonal summing signals and the RF signal are input to the tracking error signal amplifier 23 and the RF amplifier 24, respectively. The tracking error signal amplifier 23 compares phases of the input diagonal summing signals to detect a differential phase between the diagonal summing signals, and outputs the detected differential phase as a tracking error signal. The tracking error signal TE is input to the DSP 26.

Figure 3:
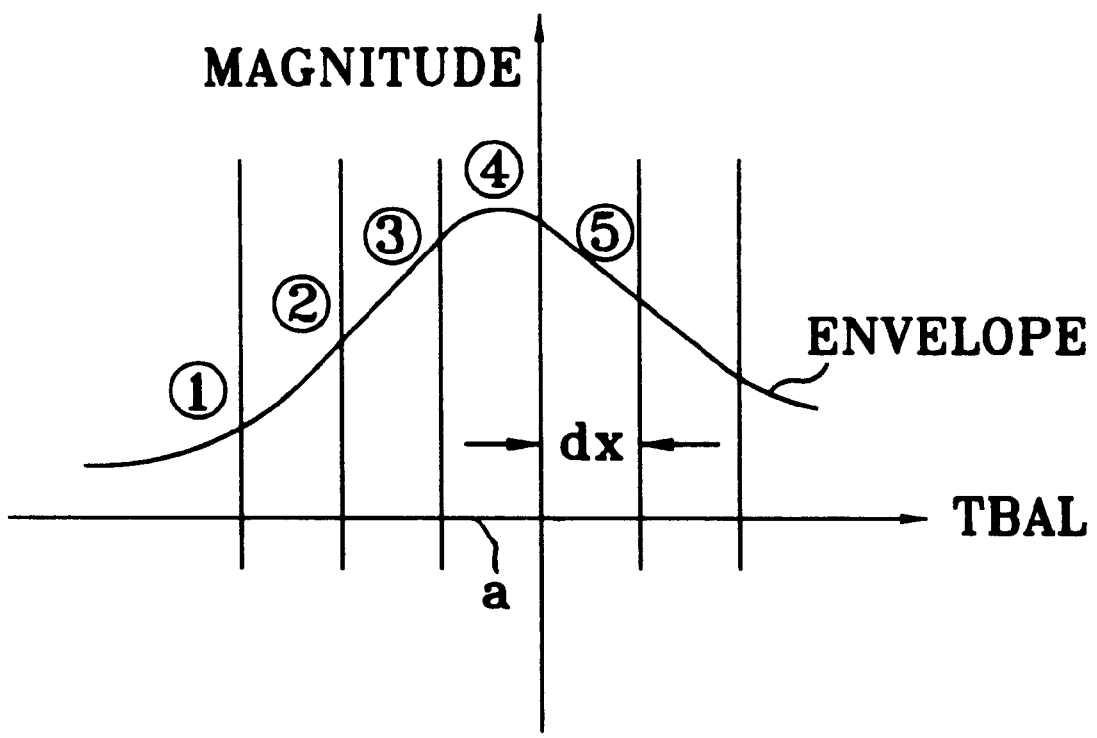
FIG. 3 is a view showing the relationship between a tracking balance correction voltage and an envelope of an amplified high frequency reproduction signal according to the embodiment of the present invention.

The DSP 26 generates a tracking drive voltage TRD to set the tracking error signal TE to zero when the tracking error signal TE input from the tracking error signal amplifier 23 is not zero, and then outputs the generated voltage TRD to the motor driver 28. When the tracking error signal TE supplied from the tracking error signal amplifier 23 is zero due to variation of the tracking drive voltage TRD, the DSP 26 generates a tracking balance correction voltage TBAL based on a maximum magnitude of an envelope signal supplied from the envelope detector 25, and outputs the tracking balance correction voltage TBAL to the tracking balance corrector 27. An operation of generating the tracking balance correction voltage TBAL by the digital signal processor 26 will be described in more detail with reference to FIG. 3.

The digital signal processor 26 varies the tracking balance correction voltage TBAL successively by a minute amount of dx, and generates the tracking drive voltage TRD which is varied by the magnitude corresponding to the varied tracking balance correction voltage TBAL. The tracking balance correction voltage TBAL generated by the DSP 26 is supplied to the tracking balance corrector 27, and then used for generating a phase correction signal to adjust the phases of the diagonal summing signals. The motor driver 28 drives the pickup circuit 22 according to the varied tracking drive voltage TRD. Then, the DSP 26 detects a magnitude of the envelope signal supplied from the envelope detector 25. The DSP 26 detects a magnitude of the envelope signal supplied from the envelope detector 25 whenever the tracking balance correction voltage TBAL is varied. The DSP 26 compares the detected magnitudes of the envelope signal to determine the maximum magnitude. For example, the DSP 26 generates the tracking balance correction voltage TBAL having a magnitude corresponding to each section in section sequence of ①→②→③→④→⑤, and compares the magnitudes of the envelope signal varied according to the varied tracking balance correction voltage TBAL. During such comparison, when a magnitude of the envelope signal at section ⑤ is smaller than that of the envelope signal at section ④, to the DSP 26 determines the envelope signal at the section ④ to have a maximum magnitude, and outputs the tracking balance correction voltage 'a' at the section ④ to the tracking balance corrector 27. The tracking balance corrector 27 outputs a phase correction signal for adjusting the phases of the diagonal summing signals according to the input tracking balance correction voltage 'a', to the tracking error signal amplifier 23. The tracking error signal amplifier 23 adjusts the phases of the diagonal summing signals input from the pickup circuit 22 according to the phase correction signal input from the tracking balance corrector 27. The tracking error signal amplifier 23 detects the differential phase between the phase-adjusted diagonal summing signals and outputs the detected differential phase to the digital signal processor 26 as the tracking error signal TE.

As described above, a tracking balance correction apparatus according to the present invention provides an effect that accurate correction for tracking balance can be performed by considering the magnitude of an envelope of a radio frequency (RF) signal detected from a disc when correcting tracking balance.

While only certain embodiments of the invention have been specifically described herein, it will be apparent that numerous modifications may be made thereto without departing from the spirit and scope of the invention.

What is claimed is:

1. An apparatus for correcting tracking balance for use in an optical disc system which obtains a tracking error signal via differential phase detection, the tracking balance correction apparatus comprising:

a pickup unit to detect a beam reflected from an optical disc and, in response, generating a high frequency reproduction signal and diagonal summing signals;

a tracking balance correction unit to receive the diagonal summing signals output from said pickup unit, to adjust phases of the received diagonal summing signals, based upon a tracking balance correction voltage, to detect a differential phase, and to output the detected differential phase as the tracking error signal;

an envelope detection unit to detect an envelope of the RF signal output from said pickup unit to output an envelope signal; and a digital signal processor to receive the tracking error signal from said tracking balance correction unit, generating a tracking drive voltage to set the tracking error signal to zero to thereby control tracking of said pickup unit, and at the same time generating the tracking balance correction voltage according to the maximum magnitude of the envelope signal from said envelope detection unit, and to then output the tracking balance correction voltage to said tracking balance correction unit.

2. The tracking balance correction apparatus according to claim 1, wherein said digital signal processor varies the tracking balance correction voltage successively by a minute amount, judges a magnitude of the envelope whenever the tracking balance correction voltage is varied, and outputs the tracking balance correction voltage to said tracking balance correction unit when the judged magnitude is the maximum magnitude of the envelope signal.

3. The tracking balance correction apparatus according to claim 1, wherein said tracking balance correction unit comprises:

a tracking balance corrector to receive the tracking balance correction voltage from said digital signal processor and output the received signal as a phase correction signal; and a tracking error signal amplifier to adjust the phases of the diagonal summing signals output from said pickup unit according to the phase correction signal received from said tracking balance corrector, detect the differential phase between the phase-adjusted diagonal summing signals, and output the detected differential phase as the tracking error signal.

4. The tracking balance correction apparatus according to claim 1, wherein said envelope detection unit comprises, a radio frequency (RF) amplifier to amplify the high frequency reproduction signal output from said pickup unit to a predetermined level and output the amplified signal; and an envelope detector to receive the amplified signal from said RF amplifier, to detect the envelope therefrom.

5. The tracking balance correction apparatus according to claim 1, further comprising a motor driver to receive the tracking drive voltage from said digital signal processor and, in response, driving a tracking servo of said pickup unit.

6. An apparatus for correcting tracking balance for use in an optical disc system which generates a reproduction signal and diagonal summing signals from a beam reflected from an optical disc, said apparatus comprising:

an envelope detection unit to detect an envelope of the reproduction signal; and a tracking error signal generator to adjust phases of the diagonal summing signals based upon the envelope, to generate a tracking error signal.

7. The apparatus as claimed in claim 6, further comprising a signal processor to determine a maximum magnitude of the envelope, wherein said tracking error signal generator adjusts the phases of the diagonal summing signals based upon the maximum magnitude of the envelope.

8. The apparatus as claimed in claim 7, further comprising:

a pickup unit to detect the beam and generate the reproduction signal and the diagonal summing signals; and a motor driver to drive a tracking servo of said pickup unit based upon a tracking drive voltage;

wherein said signal processor generates the tracking drive voltage to set the tracking error signal to a predetermined value.

9. The apparatus as claimed in claim 7, wherein:

said signal processor generates a tracking balance correction voltage based upon the maximum magnitude of the envelope; and said tracking error signal generator includes a tracking balance corrector to generate a phase correction signal based upon the tracking balance correction voltage, and a tracking error signal amplifier to adjust the phases of the diagonal summing signals based upon the phase correction, to generate the tracking error signal.

10. The apparatus as claimed in claim 8, wherein:

said signal processor generates a tracking balance correction voltage based upon the maximum magnitude of the envelope; and said tracking error signal generator includes a tracking balance corrector to generate a phase correction signal based upon the tracking balance correction voltage, and a tracking error signal amplifier to adjust the phases of the diagonal summing signals based upon the phase correction, to generate the tracking error signal.

11. The apparatus as claimed in claim 7, wherein said envelope detection unit comprises:

an reproduction amplifier to amplify the reproduction signal; and an envelope detector to detect the envelope of the amplified reproduction signal.

12. The apparatus as claimed in claim 10, wherein said signal processor generates the tracking drive voltage when the tracking error signal does not have the predetermined value, and generates the tracking balance correction voltage when the tracking error signal has the predetermined value.

13. The apparatus as claimed in claim 9, wherein said signal processor determines the maximum magnitude of the envelope when varying the tracking balance correction voltage.

14. An apparatus for correcting a tracking balance of an optical system during reproduction of data from an optical disc, wherein the optical system generates a reproduction signal based upon a beam reflected from the optical disc, the apparatus comprising:

means for determining the tracking balance of the optical system;

means for detecting an envelope of the reproduction signal;

means for correcting the tracking balance of the optical system based upon the detected envelope; and a pickup unit to generate the reproduction signal and diagonal summing signals, wherein said determining means adjusts phases of the diagonal summing signals based upon the detected envelope, to generate a tracking error signal used for determining the tracking balance.

* * * * *